Figure 5:
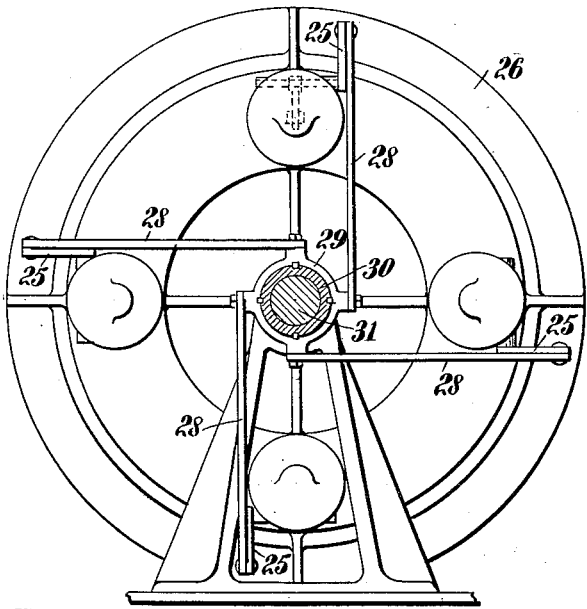

H. FÖTTINGER.
TRANSMISSION DEVICE.
APPLICATION FILED JAN. 26, 1910.
1,199,361.
Patented Sept. 26, 1916.
3 SHEETS—SHEET 1.
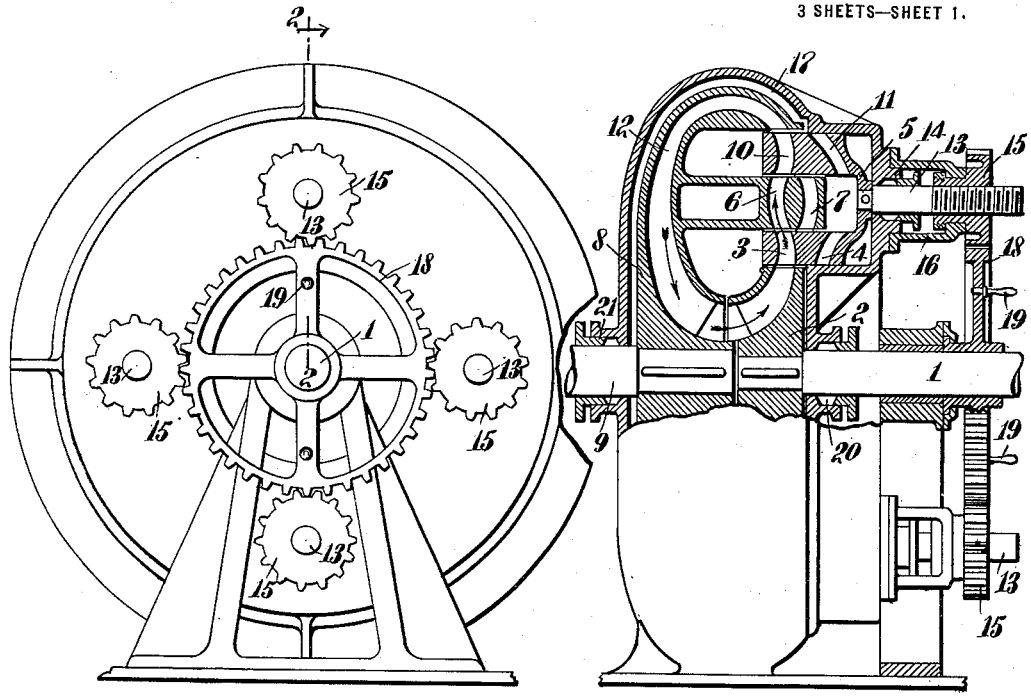
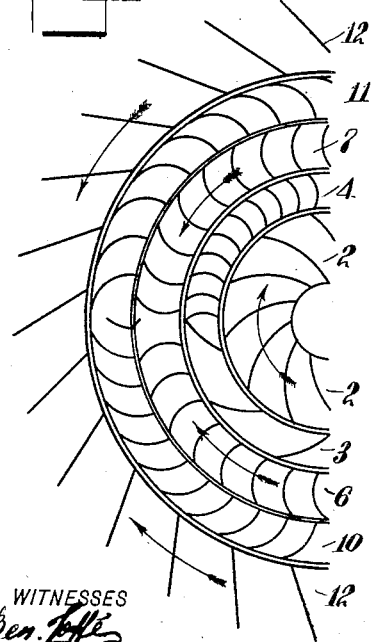
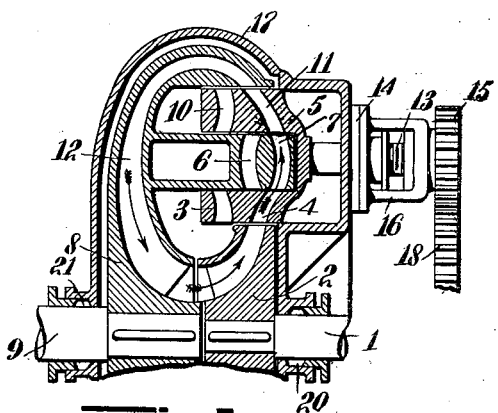
INVENTOR
Hermann Föttinger
BY
ATTORNEYS

H. FÖTTINGER.
TRANSMISSION DEVICE.
APPLICATION FILED JAN. 26, 1910.

1,199,361.

Patented Sept. 26, 1916.
3 SHEETS—SHEET 2.

WITNESSES,

INVENTOR
Hermann Föttinger
BY
ATTORNEYS

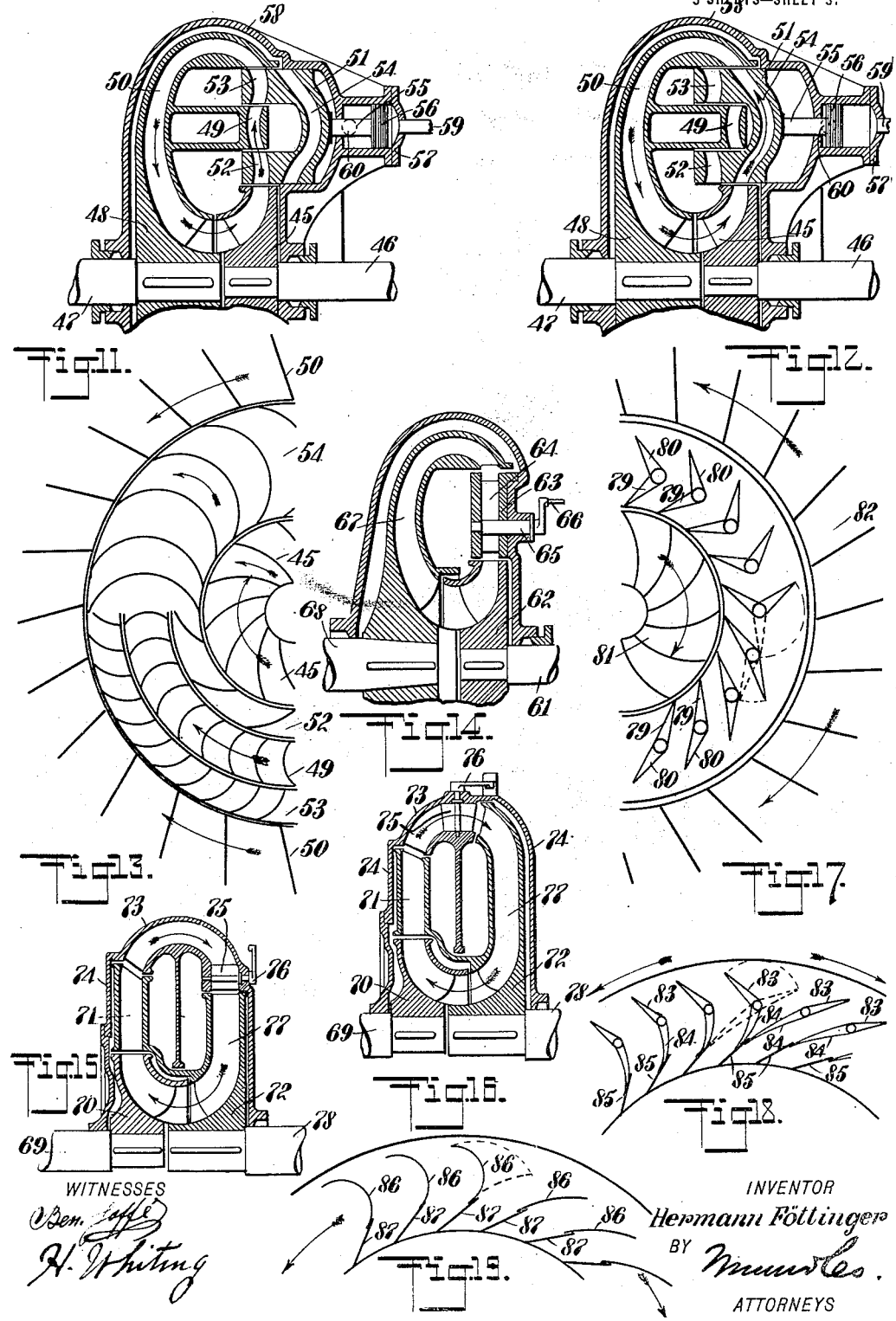

UNITED STATES PATENT OFFICE.

HERMANN FÖTTINGER, OF STETTIN, GERMANY.

TRANSMISSION DEVICE.

1,199,361.  Specification of Letters Patent.  Patented Sept. 26, 1916.

Application filed January 26, 1910. Serial No. 540,163.

*To all whom it may concern:*

Be it known that I, HERMANN FÖTTINGER, a subject of the King of Bavaria, and a resident of Stettin, Germany, have invented a new and Improved Transmission Device, of which the following is a full, clear, and exact description.

This invention relates to certain improvements in hydraulic power transmitters of that type in which a centrifugal pump impeller and a turbine rotor constitute the driving and driven members and are suitably juxtaposed whereby the liquid thrown out by the impeller by centrifugal force may impinge upon and produce the desired rotation of the driven member, both by the fluid velocity energy and the fluid pressure energy. The kinetic energy of the liquid is absorbed in the driven member and said liquid is then guided back to the inlet of the propeller. In such hydraulic power transmitters, the driving and driven members are preferably arranged coaxially and the space between the driving and driven members is made as short as possible to utilize to the fullest extent the kinetic energy of the liquid traveling at high velocity.

In my prior and co-pending application Serial No. 322,395, filed June 19, 1906, I have disclosed a considerable number of different forms which I have devised, by means of which the desired results may be secured. In certain of these forms, the driving and driven members define the entire circuit for the liquid while in other forms non-rotatable, annular, liquid guiding members are interposed in the circuit either to return the liquid from the driven member to the driving member or to guide the liquid from the driving to the driven member. I have also disclosed different constructions in some of which the guiding member is stationary, and in others it is adjustable either bodily or by the individual adjustment of the separate vanes, to regulate or control the flow and if desired, to reverse the direction of rotation of the driven member. In said application, I have claimed my invention broadly and have claimed specifically the particular type in which the driving and driven members make up the entire circuit.

In my co-pending application Serial No. 540,162 filed on even date herewith, I have divided out from said application Serial No. 322,395, and have claimed specifically, those forms in which a non-rotatable annular guiding member is interposed in the circuit but have not claimed specifically those forms in which a regulation or controlling of the liquid is secured by an adjustable member.

In the present application, I have claimed broadly the adjustable means for regulating, varying or controlling at will, the flow of the fluid and have more specifically claimed a construction in which the guiding member is longitudinally movable. The preferred embodiment of the invention herein claimed is a form in which the guide member conducts the liquid in the plane of rotation of said members from the peripherally disposed outlets of the driving member to the concentrically arranged inlets of the driven member. The specific form in which a stationary or movable guiding member encircles both the driving and driven member and conducts the liquid from the peripherally disposed outlets of the driving member to the peripherally disposed inlets of the coaxial driven member, is claimed more specifically in my co-pending application Serial No. 842,409 filed June 2, 1914.

In carrying out my invention, the driving, driven and guiding members are preferably inclosed within a casing containing a constant volume of liquid, and preferably the casing is of such shape as to closely follow the contour of the members and thus confine substantially all of the liquid within the members themselves. The liquid is caused to move in a direction having a radial component, by the driving member and as it leaves the outlets, it tends to flow in a tangential direction due to centrifugal force. The guiding member receives this liquid and directs its flow to the driven member and by varying or adjusting this guiding member or the vanes thereof, I am able to control the direction of flow and the angle of impact of the liquid against the vanes of the driven member. Thus, I may vary the torque and the relative speed ratio of the driving and driven members. I may not only control the direction of flow of the liquid, but may control the amount of the flow as for instance by permitting the guiding member to partially shut off or close the outlets from the driving member.

Reference is to be had to the accompanying drawings forming a part of this specification, in which—

Figure 6:
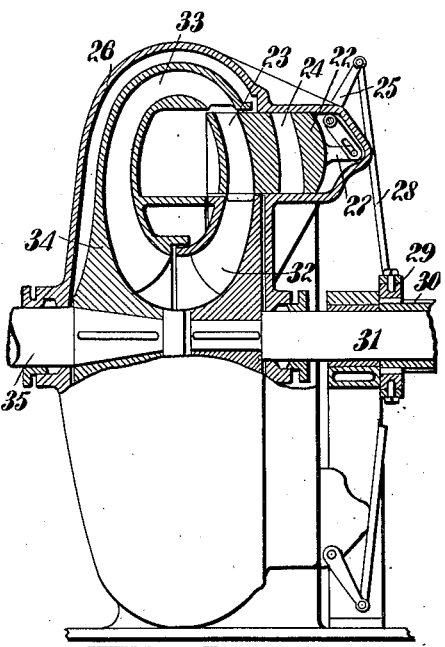
Figure 8:
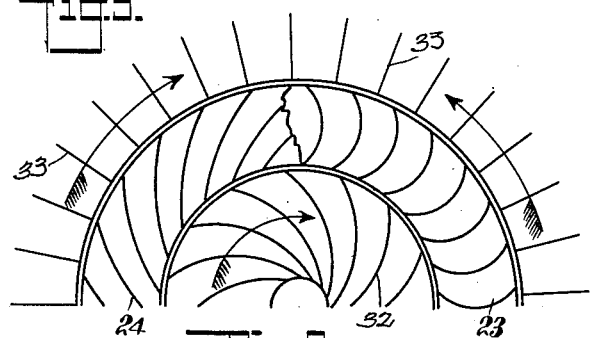
Figure 7:
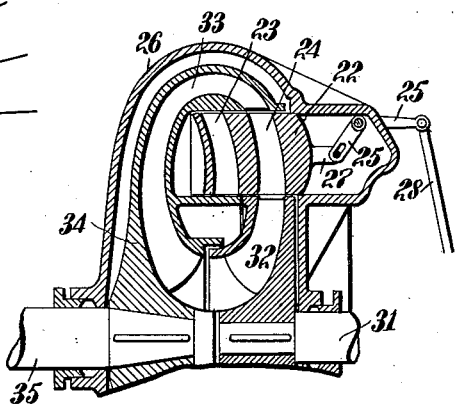
Figures 9, 10:
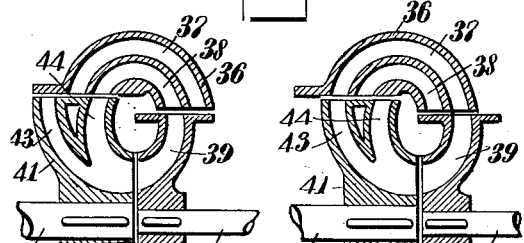

Figure 1 is an end view in elevation, of one form of my device; Fig. 2 is a side view of Fig. 1, partly in section on the line 2—2 in Fig. 1, showing the guide wheel in one position; Fig. 3 is a fragmentary section on the line 2—2 in Fig. 1, showing the guide wheel in the opposite position from that shown in Fig. 2; Fig. 4 is a diagrammatic illustration, showing in the upper half the curvature of the vanes through which the operative medium flows in the circuit formed in Fig. 3, and in the lower half, the curvature of the vanes through which the operative medium flows in the circuit formed in Fig. 2; Fig. 5 is an end view of another form of my device; Fig. 6 is a side view of the same, partly in section, showing the guide wheel in one position; Fig. 7 is a fragmentary section similar to Fig. 6, showing the guide wheel in a position opposite to that in Fig. 6; Fig. 8 is a diagrammatic view, showing on the right-hand side the curvature of the vanes through which the operative medium flows in the circuit formed in Fig. 6, and on the left hand-side, showing the curvature of the vanes through which the operative medium flows in the circuit formed in Fig. 7; Figs. 9 and 10 are fragmentary vertical sections illustrating another form of my device, showing the two positions of the guide wheels; Fig. 11 is a fragmentary vertical section of another form of my device, showing the guide wheel in its outer position; Fig. 12 is a view similar to Fig. 11, showing the guide wheel in its inner position; Fig. 13 is a diagrammatic view illustrating in its upper half the curvature of the vanes through which the operative medium flows in the circuit formed in Fig. 12, and in its lower half, the curvature of the vanes through which the operative medium flows in the circuit formed in Fig. 11; Figs. 14, 15 and 16 illustrate various forms of my device, in which the guide vanes in the guide wheels are themselves made shiftable to change the relative rotation of the secondary wheel to the primary wheel, either as to speed or direction; and Figs. 17, 18 and 19 illustrate in their various positions, different types of adjustable vanes on guide wheels.

Referring more particularly to the separate parts in Figs. 1 to 4, 1 indicates a primary shaft, to which is secured in any well known manner a primary turbine wheel 2. The primary turbine wheel 2 is adapted to impart both velocity and pressure energies to a suitable operative medium, such as water, hot or cold, alcohol, ether, petroleum or mercury. The energized operative fluid is shot from the primary turbine wheel 2 into any one of a plurality of preliminary stage rings 3 and 4 on a guide wheel 5.

In the position of the guide wheel 5 illustrated in Fig. 2 the operative medium will first pass into the preliminary stage 3, but in the position shown in Fig. 3, the operative medium will first pass into the preliminary stage 4 on the guide wheel 5. From the preliminary stages on the guide wheel 5, the operative medium passes to any one of a plurality of passage rings 6 and 7, on the first stage of a secondary turbine wheel 8, which is secured in any well known manner to a secondary shaft 9, according to the position of the guide wheel 5. In its first stage on the secondary turbine wheel 8, the velocity energy of the operative medium is absorbed, and the operative medium directed in the proper direction to any one of a plurality of second-stage passage rings 10 and 11 on the guide wheel 5.

From the second-stage guide passage on the guide wheel 5, the operative medium passes to a second stage 12 on the secondary turbine wheel 8, from whence it returns to the intake side of the primary turbine wheel 2. The number of stages on the guide wheel 5 and the secondary turbine wheel 8 may be varied according to the conditions desired. The number of passage rings on the stages of the guide wheel 5 and the secondary turbine wheel 8 may be also varied, in order to obtain a variety of speeds or a gradual reversal of the secondary turbine wheel 8 from rotation in one direction to rotation in the opposite direction.

In the form illustrated in Figs. 1 to 4, the guide vanes in the passage rings 3, 6 and 10 are curved in the opposite direction, respectively, to the guide vanes in the passage rings 4, 7 and 11, so that the operative medium will be diverted in different directions, according to the circuit in which it travels, thus rotating the secondary wheel in different directions, according to the circuit in which it travels. These vanes may be so curved as to give different speeds to the secondary wheel 8, instead of different directions.

In order to bring any of the passages in the guide wheel 5 into operation, the guide wheel 5 is shifted bodily by means of a plurality of screws 13, which are secured in any well known manner to the wheel 5, and extend out through packing boxes 14. Each of these screws 13 are engaged by nuts 15, which are rotatably supported on a frame 16, which is secured in any well known manner on a casing 17, which incloses the active members of the turbine transmission. Each of the nuts 15 is provided with teeth on its outer periphery, forming a pinion, which meshes with a central gear 18 rotatably secured in any well known manner on the shaft 1. Various different means may be provided for rotating the gear 18, such as handles 19. By rotating the gear 18, the pinion nuts 15 are correspondingly rotated in the opposite direction, thereby advancing or withdrawing the screws 13 bodily, thus reciprocating evenly the guide wheel 5. While the handles 19 are shown for operating the gear 18, distant or automatic control may be used. The casing 17 is provided with stuffing boxes 20 and 21, which surround the shafts 1 and 9 where they enter the casing.

The casing is entirely filled with liquid which is prevented from escaping by the stuffing boxes surrounding the shafts and is continuously circulated through the driving, driven, and guiding members. It is of course evident that such portion of the liquid as occupies the space outside of these members does not aid in the transmission of power but prevents the escape of liquid from between said members and avoids the necessity of stuffing boxes or a tight fit at those places where liquid passes from one member to the other. The guiding member serves not only to control the direction in which the liquid is traveling when it impinges on the blades of the driven member, but, if stopped in an intermediate position, serves to control the amount of liquid flowing from the driving to the driven member.

In the form illustrated in Figs. 5 to 8, there is shown a single-stage guide wheel, designated by the number 22, with a plurality of passage rings 23 and 24. The means for shifting the guide wheel also is somewhat different from that illustrated in Figs. 1 to 3, and consists of a plurality of bell crank levers 25, pivotally secured in any well known manner to a casing 26, inclosing the operative parts of the turbine transmission. These bell crank levers 25 have a slidingly pivoted engagement with lugs 27 secured at intervals on the guide wheel 22. The outer arms of the bell crank levers 25 are connected by means of links 28 to a collar 29, which is splined onto a sleeve 30, which in turn is supported on a primary shaft 31 in such a manner as to permit said shaft to rotate without rotating the sleeve. The collar 29 may be shifted back and forth on the sleeve 30, thereby reciprocating the guide wheel 22, bringing either of the passages 23 and 24 into operation.

The primary shaft 31 is provided with a primary turbine 32, which is secured to it in any well known manner. The primary turbine 32 is adapted to impart energy to an operative fluid, which will pass through either one of the passages 23 or 24, according to the position of the guide wheel 22, into a passage ring 33 on a secondary turbine wheel 34, which is secured in any well known manner to a secondary shaft 35. The curvatures of the blades in the passage rings 23 and 24 are illustrated in the right and left-hand sides, respectively, of Fig. 8. The forms of the blades on the primary turbine wheel 32, and the secondary turbine wheel 34 are also illustrated in Fig. 8.

Figs. 9 and 10 illustrate another form of a shiftable guide wheel 36, having a plurality of passage rings 37 and 38, which are adapted to be brought into coaction with a primary turbine wheel 39 on a primary shaft 40. In this form, a secondary turbine wheel 41 is provided on a secondary shaft 42, of such a form that when the passage ring 37 is brought into coaction with the primary turbine 39, the operative medium will be delivered to a longer circuit 43 on the secondary wheel 41. If, however, the passage ring 38 is shifted into coaction with the primary turbine wheel 39, as illustrated in Fig. 9, the operative medium will be delivered to a shorter circuit 44 on the secondary turbine wheel 41. The blades in the passages 37 and 38 on the guide wheel 36, and in the circuits 43 and 44 on the secondary turbine 41, may be conformed either to give different directions of rotation to the secondary shaft 42, or different speeds of rotation.

The form illustrated in Figs. 11 to 13 is similar to the form illustrated in Figs. 1 to 4, to the extent that it has a primary turbine wheel 45 on a primary shaft 46, and a secondary shaft 47, which has thereon a secondary turbine wheel 48, divided into two stages 49 and 50. There is also provided a guide wheel 51, which, however, differs from the guide wheel shown in Figs. 1 to 4, in that it has multiple-stage passage rings 52 and 53, which coact with the stage 49 on the secondary turbine wheel, and a single-stage passage ring 54, which does not coact with an intermediate stage on the secondary turbine wheel, but guides the operative fluid direct from the primary turbine wheel 45 to the second stage 50 on the secondary turbine wheel 48.

The curvatures of the vanes or blades in the passage ring 54 are illustrated in the upper half of Fig. 13, and the curvatures of the passage rings 49, 52 and 53 are illustrated in the lower half of Fig. 13. These passage rings will give opposite directions of rotation to the secondary turbine wheel 48, as illustrated in Fig. 13. In these Figs. 11, 12 and 13, another form of shift for a guide wheel is illustrated. This consists of a plurality of rods 55, which are secured in any well known manner to the ring 54 at one end, and to pistons 56 at the other end. These pistons are adapted to reciprocate in cylinders 57, secured in any well known manner to a casing 58, which incloses the active parts of the turbine transmission. The pistons 56 may be operated by any motive fluid, such as compressed air, steam or the like, which is supplied through pipes 59 and 60.

Figs. 14, 15 and 16 illustrate various forms in which, instead of shifting the guide wheel bodily, the vanes on the guide wheel are manipulated to be curved or deflected in different directions, so as to vary the flow of the operative medium from the primary turbine wheel to the secondary turbine wheel, in order to produce various speeds and directions of rotation in the secondary turbine wheel.

In Fig. 14, 61 illustrates a primary shaft, on which is secured a primary turbine 62, which energizes the operative medium and directs it into a guide wheel 63, which is provided with movable blades or vanes 64, secured in any well known manner on pivotal shafts 65. The shafts 65 may be operated simultaneously or in groups to obtain any desired direction or curvature of the blades 64, by means of cranks 66. The operative fluid passes from the guide wheel 63 to a secondary wheel 67 secured on a secondary shaft 68.

In the form illustrated in Fig. 15, 69 represents a primary shaft, on which is secured a primary turbine 70, which energizes the operative fluid and directs it to a first stage 71 on a secondary turbine wheel 72 on a secondary shaft 78. The operative fluid passes from the first stage 71 into a guide wheel 73 formed on part of an inclosing casing 74. Movable vanes 75 are provided in this guide wheel 73, and are adapted to be manipulated by means of a plurality of cranks 76, one of which only is shown. The operative fluid passes from the guide wheel 73 into a second stage 77 on the secondary turbine wheel 72, from whence it is delivered back into the intake side of the primary turbine 70. The blades 75 in this form may be made flexible if desired.

Fig. 16 differs from Fig. 15 merely in the form of the shiftable guide blade, and the parts are designated by the same numerals.

Fig. 17 illustrates diagrammatically one form of guide wheel with shiftable guide blades. The guide blades in this form comprise stationary portions 79 and movable portions 80. The movable portions 80 are adapted to be shifted from the position shown in the upper half of the figure to the position show in the lower half of the figure, so as to change the direction of rotation transmitted from a primary turbine 81 to a secondary turbine 82.

Fig. 18 illustrates diagrammatically a form in which both portions 83 and 84 of shiftable guide vanes on the guide wheel are movable to coact with stationary guide vanes 85 on the guide wheel, to form various passages, through which the operative fluid will be directed from the primary turbine wheel to the secondary turbine wheel. In this figure, the movable portions 84 of the guide vanes are illustrated as being flexible.

Fig. 19 illustrates diagrammatically the ideal form, based on the form illustrated in Fig. 18, in which movable guide blades 86 are flexible throughout their length, so as to form perfectly curved vanes to coact with stationary guide vanes 87.

In Figs. 18 and 19, I have not illustrated in detail the means for moving the vanes or blades, as such means, *per se*, forms no part of my present invention. Any suitable means may be employed for accomplishing the result and in these figures I merely desire to indicate the positions to which the vanes or blades may be moved, rather than attempting to disclose any particular means for so moving them.

While I have shown various structural forms as illustrating various forms of my invention, I do not wish to be limited to any of these forms, but desire to cover the invention of transmitting power from one shaft to another shaft by fluid pressure means, comprising a primary turbine wheel and a secondary turbine wheel, with the interposition of shiftable guide means, to take up the reaction of the operative fluid, and to properly direct the operative fluid from the primary turbine wheel to the secondary turbine wheel, so as to obtain various speeds and different directions of rotation.

Having thus described my invention, I claim as new and desire to secure by Letters Patent:—

1. In a transmission device, the combination with a primary shaft, of a secondary shaft, and means for transmitting power from said primary shaft to said secondary shaft, comprising a primary turbine wheel, a secondary turbine wheel driven by the kinetic energy of the fluid discharged from the primary turbine wheel, and shiftable liquid guiding means juxtaposed to said turbine wheels.

2. In a transmission device, the combination with a primary shaft, of a secondary shaft, and means for transmitting power from said primary shaft to said secondary shaft, comprising a primary turbine wheel, a secondary turbine wheel, and shiftable liquid guiding means interposed between said turbine wheels.

3. In a transmission device, the combination with a primary shaft, of a secondary shaft, and means for transmitting power from said primary shaft to said secondary shaft, comprising a primary turbine wheel, a multiple-stage secondary turbine wheel, and shiftable liquid guiding means juxtaposed to said turbine wheels.

4. In a transmission device, the combination with a primary shaft, of a secondary shaft, and means for transmitting power from said primary shaft to said secondary shaft, comprising a primary turbine wheel, a multiple-stage secondary turbine wheel, and shiftable liquid guiding means interposed between the stages of said secondary turbine wheel.

5. In a transmission device, the combination with a plurality of shafts, of a turbine wheel on one of said shafts, a multiple-stage turbine wheel on another of said shafts, and shiftable guiding means juxtaposed to said turbine wheels.

6. In a transmission device, the combination with a plurality of shafts, of a turbine wheel on one of said shafts, a multiple-stage turbine wheel on another of said shafts, and shiftable guiding means interposed between said turbine wheels.

7. In a transmission device, the combination with a primary shaft, of a secondary shaft, and means for transmitting power from said primary shaft to said secondary shaft, comprising a primary turbine wheel, a multiple-stage secondary turbine wheel, and shiftable guiding means interposed between said primary turbine wheel and said secondary turbine wheel.

8. In a transmission device, the combination with a primary shaft, of a secondary shaft, and means for transmitting power from said primary shaft to said secondary shaft, comprising a primary turbine wheel, a multiple-stage secondary turbine wheel, shiftable guiding means interposed between the stages of said secondary turbine wheel, and shiftable guiding means interposed between said primary turbine wheel and said secondary turbine wheel.

9. In a transmission device, the combination with a primary shaft, of a secondary shaft, fluid turbine means for transmitting power from said primary shaft to said secondary shaft in one direction, and means for reversing the direction of said transmission, comprising shiftable guiding means.

10. In a transmission device, the combination with a primary shaft, of a secondary shaft, and means for transmitting power from said primary shaft to said secondary shaft comprising a primary turbine wheel, a secondary turbine wheel, shiftable guiding means juxtaposed to said turbine wheels, and means for shifting said guiding means.

11. In a transmission device, the combination with a primary shaft, of a secondary shaft, and means for transmitting power from said primary shaft to said secondary shaft, comprising a primary turbine wheel, a secondary turbine wheel, and a shiftable guide wheel juxtaposed to said turbine wheels.

12. In a transmission device, the combination with a primary shaft, of a secondary shaft, and means for transmitting power from said primary shaft to said secondary shaft, comprising a primary turbine wheel, a secondary turbine wheel, and a shiftable guide wheel interposed between said turbine wheels.

13. In a transmission device, the combination with a primary shaft, of a secondary shaft, and means for transmitting power from said primary shaft to said secondary shaft, comprising a primary turbine wheel, a multiple-stage secondary turbine wheel, and a shiftable turbine wheel juxtaposed to said first-mentioned turbine wheels.

14. In a transmission device, the combination with a primary shaft, of a secondary shaft, and means for transmitting power from said primary shaft to said secondary shaft, comprising a primary turbine wheel, a multiple-stage secondary turbine wheel, and a shiftable guide wheel interposed between the stages of said secondary turbine wheel.

15. In a transmission device, the combination with a plurality of shafts, of a turbine wheel on one of said shafts, a multiple-stage turbine wheel on another of said shafts, and a shiftable guiding wheel juxtaposed to said turbine wheels.

16. In a transmission device, the combination with a plurality of shafts, of a turbine wheel on one of said shafts, a multiple-stage turbine wheel on another of said shafts, and a shiftable guiding wheel interposed between said turbine wheels.

17. In a transmission device, the combination with a primary shaft, of a secondary shaft, and means for transmitting power from said primary shaft to said secondary shaft, comprising a primary turbine wheel, a multiple-stage secondary turbine wheel, and a shiftable guide wheel interposed between said primary turbine wheel and said secondary turbine wheel.

18. In a transmission device, the combination with a primary shaft, of a secondary shaft, and means for transmitting power from said primary shaft to said secondary shaft, comprising a primary turbine wheel, a multiple-stage secondary turbine wheel, a shiftable guide ring interposed between the stages of said secondary turbine wheel, and a shiftable guide ring interposed between said primary turbine wheel and said secondary turbine wheel.

19. In a transmission device, the combination with a primary shaft, of a secondary shaft, fluid turbine means for transmitting power from said primary shaft to said secondary shaft in one direction, and means for reversing the direction of said transmission, comprising a shiftable guide wheel.

20. In a transmission device, the combination with a primary shaft, of a secondary shaft, and means for transmitting power from said primary shaft to said secondary shaft, comprising a primary turbine wheel, a secondary turbine wheel, and a guide wheel having a plurality of passage rings.

21. In a transmission device, the combination with a primary shaft, of a secondary shaft, and means for transmitting power from said primary shaft to said secondary shaft, comprising a primary turbine wheel, a secondary turbine wheel, a guide wheel having a plurality of passage rings, and means for shifting said guide wheel so as to bring any of said passage rings into coaction with said turbine wheels.

22. In a transmission device, the combination with a primary shaft, of a secondary shaft, and means for transmitting power from said primary shaft to said secondary shaft, comprising a primary turbine wheel, a secondary turbine wheel and a shiftable guide wheel having a plurality of stages.

23. In a transmission device, the combination with a primary shaft, of a secondary shaft, and means for transmitting power from said primary shaft to said secondary shaft, comprising a primary turbine wheel, a secondary turbine wheel, and a shiftable guide wheel, having a plurality of passages, one of said passages being composed of a plurality of separate guide rings.

24. In a transmission device, the combination with a primary shaft, of a secondary shaft, and means for transmitting power from said primary shaft to said secondary shaft, comprising a primary turbine wheel, a secondary turbine wheel, and a shiftable guide wheel, having a plurality of passages, each of said passages being composed of a plurality of separate guide rings.

25. In a transmission device, the combination with a primary shaft, of a secondary shaft, and means for transmitting power from said primary shaft to said secondary shaft, comprising a primary turbine wheel, a secondary turbine wheel, a shiftable guide wheel having a plurality of passages, each of said passages being composed of a plurality of separate guide rings, and means for shifting said guide wheel so as to bring any of said passages into coaction with said turbine wheels.

26. In a transmission device, the combination with a primary shaft, of a secondary shaft, and means for transmitting power from said primary shaft to said secondary shaft, comprising a primary turbine wheel, a secondary turbine wheel, a shiftable guide wheel having a plurality of passages, each of said passages being composed of a plurality of separate guide rings, mechanism for shifting said guide wheel, and means for operating said mechanism.

27. In a hydraulic power transmitting apparatus, the combination with a rotatable driving member, of a closed casing containing a liquid and inclosing said driving member, a driven member within said casing, means on said driving member adapted to move said liquid in the same centrifugally in a direction which has a radial component and direct the liquid to said driven member, whereby the driven member is actuated, and means for controlling the flow of the liquid to said driven member.

28. In a hydraulic power transmitting apparatus, the combination with a rotatable driving member, of a driven member adapted to rotate independently of said driving member, a casing inclosing said members and adapted to contain a liquid, a plurality of vanes on said driving member, a plurality of vanes on said driven member, the vanes on said driving member being adapted to direct liquid in a direction which has a radial component to the vanes of said driven member, and means for controlling the amount of liquid flowing to said driven member.

29. In a hydraulic power transmitting apparatus, the combination with a driving member, of a rotatable driven member, a closed casing containing a liquid and inclosing said members, a plurality of vanes on said driving member, a plurality of vanes on said driven member and located concentrically with the vanes of the driving member, the vanes of the driving member being adapted to direct liquid in a direction which has a radial component to the vanes of said driven member, and means for controlling the amount of liquid flowing to said driven member.

30. In a hydraulic power transmitting apparatus, the combination with a rotatable driving member, of a driven member adapted to rotate independently of said driving member, a casing inclosing said members and adapted to contain a liquid, a plurality of vanes on said driving member, a plurality of vanes on said driven member, the vanes of said driving member being adapted to direct liquid in a direction which has a radial component to the vanes of said driven member, and means for controlling the amount of liquid flowing to said driven member.

31. In a hydraulic power transmitting apparatus, the combination with a driving member, of a closed casing containing a liquid and inclosing said driving member, a driven member located within said casing and adapted to rotate independently of said driving member, a plurality of impelling vanes on said driving member, a plurality of vanes on said driven member, the vanes of said driving member being adapted to direct liquid in a direction which has a radial component to the vanes of said driven member, whereby the driven member is actuated, and means for controlling the liquid flowing to said driven member.

32. In a hydraulic power transmitting apparatus, the combination with a driving member, of a closed casing adapted to contain a liquid and inclosing said driving member, a driven member located within said casing, means on said driving member adapted to gradually increase the velocity of said liquid toward the periphery and direct the same to said driven member, and means for controlling the flow of the liquid to said driven member.

33. The combination with a closed casing containing a confined volume of liquid, of a turbine wheel located therein, an impeller located within the said casing and adapted to direct said liquid in a direction which has a radial component to said turbine wheel, whereby the same is actuated, and means for controlling the amount of liquid flowing to said turbine wheel.

34. The combination with a closed casing containing a confined volume of liquid, of a turbine wheel located therein, an impeller located in said casing and adapted to direct liquid in a direction which has a radial component to said turbine wheel, whereby the same is actuated, and means for controlling the flow of the liquid to said turbine wheel.

35. The combination with a closed casing containing a confined volume of liquid, of a shaft rotatably mounted therein, an impeller fixedly secured to said shaft, a turbine wheel located in said casing, said impeller being adapted to direct liquid in a direction which has a radial component to said turbine wheel, whereby the same is actuated, and means for controlling the amount of liquid flowing to said turbine wheel.

36. In a hydraulic transmitting apparatus, the combination with a driving member, of a driven member, means carried by said driving member and adapted to create a fluid pressure and direct the fluid under pressure in a direction which has a radial component to said driven member, whereby the same is actuated, and means for controlling the flow of the liquid to said driven member.

37. The combination with a rotatable driving member, of a rotatable driven member, an annular guiding member, a liquid of constant volume adapted to transmit power from said driving member to said driven member, the driven member and the guiding member being longitudinally movable relatively to control the rotation of the driven part relatively to the driving part.

38. The combination with a rotatable driving member, of a rotatable driven member, a liquid of constant volume contained in said driven member, and means on said driving member adapted to move said liquid in said driving member centrifugally and direct the same to said driven member in the plane of rotation of said members, whereby the driven member is actuated, and means for changing the direction of impact of the liquid against the driven member.

39. In combination a rotatable driving member, a rotatable driven member, an annular guiding member capable of longitudinal movement relatively to one of said first mentioned members, and a liquid of constant volume contained in said members and adapted to transmit power from said driving member to said driven member.

40. In combination a rotatable shaft, a driving member secured to said shaft, a rotatable driven member adapted to rotate independently of said driving member, an annular guiding member receiving liquid from one member and delivering to the other of said members, one of said members being capable of longitudinal movement relative to another of said members to control the rotation of said driven member.

41. In a hydraulic power transmitting apparatus the combination with a driving member, of a driven member, a closed casing containing a liquid, means suited to move said liquid in said driving member centrifugally in a direction which has a radial component and direct the same from said driving member to said driven member, whereby said driven member is actuated, and means for controlling the flow of the liquid to said driven member.

42. A power transmitting mechanism, comprising a rotary driving member provided with vanes to force liquid from the intake toward the periphery, an annular guiding member provided with a series of guiding vanes and a rotary driven member having an annular series of vanes receiving liquid from the outlet of said guiding vanes and delivering it to the intake of said driving member, one of said series of vanes being bodily adjustable to vary the torque developed.

43. A fluid gear including a centrifugal pump impeller, a turbine wheel co-axial therewith and disposed closely adjacent thereto, and a guiding member including two sections either one of which may be brought into operation by an axial bodily shifting of the guiding member.

In testimony whereof I have signed my name to this specification in the presence of two subscribing witnesses.

HERMANN FÖTTINGER.

Witnesses:
 LUDWIG WACHTEL,
 EMIL SCHMIDT.